United States Patent [19]

Schüsseler

[11] 4,306,819
[45] Dec. 22, 1981

[54] DEFORMABLE FIBROUS PEN CONSTRUCTION FOR SELECTIVE NIB PLACEMENT

[75] Inventor: Heinz-Werner Schüsseler, Thum-Kreuzau, Fed. Rep. of Germany

[73] Assignee: Dia-Nielsen GmbH, Zubehör für die Messtecknik, Fed. Rep. of Germany

[21] Appl. No.: 129,303

[22] Filed: Mar. 11, 1980

[30] Foreign Application Priority Data

Mar. 24, 1979 [DE] Fed. Rep. of Germany ... 7908307[U]

[51] Int. Cl.³ ................................................. B43K 5/00
[52] U.S. Cl. ........................... 401/198; 138/DIG. 8; 346/140 R; 401/6; 401/88; 401/199; 401/209
[58] Field of Search .............. 401/196, 198, 199, 209, 401/6; 346/140 R, 140 A; 138/DIG. 8

[56] References Cited

U.S. PATENT DOCUMENTS

| 2,704,556 | 3/1955 | Blish | 138/DIG. 8 |
| 3,003,182 | 10/1961 | Rosenthal | 401/199 X |
| 3,804,538 | 4/1974 | Rosa | 401/209 |
| 4,017,871 | 4/1977 | Hubbard | 401/198 X |

FOREIGN PATENT DOCUMENTS

| 2018758 | 11/1971 | Fed. Rep. of Germany | 401/198 |
| 2642476 | 3/1978 | Fed. Rep. of Germany | 401/198 |
| 52-70570 | 11/1977 | Japan | 138/DIG. 8 |
| 28491 | of 1912 | United Kingdom | 401/198 |

*Primary Examiner*—Steven A. Bratlie
*Attorney, Agent, or Firm*—John C. Smith, Jr.

[57] ABSTRACT

A fibrous pen for recording instruments and the like comprises an ink supply container, at least one writing tube extending therefrom and a fibrous or lamella writing nib extending through the writing tube and from the free end thereof. The writing tube comprises an outer plastic tube and an inner deformable metallic tube. The deformable metallic tube permits the writing tube to be permanently bent to precisely position the end of the writing nib at a predetermined location.

3 Claims, 1 Drawing Figure

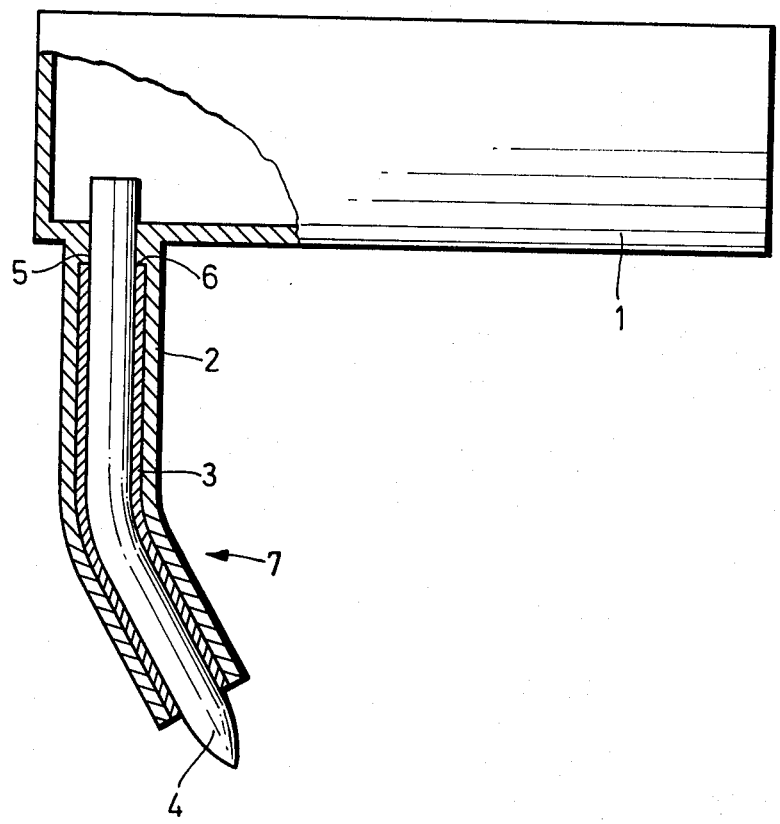

DEFORMABLE FIBROUS PEN CONSTRUCTION FOR SELECTIVE NIB PLACEMENT

BACKGROUND OF THE INVENTION

This invention relates to a fibrous pen for recording instruments and the like wherein the tip of the fibrous or lamella writing nib extending from the end of the writing tube may be permanently positioned by bending the writing tube.

Various fibrous pen constructions for use with recording instruments and the like have been known in the art. In one prior art construction a metallic writing tube having a fibrous or lamella writing nib projecting from the free end thereof extends from a plastic ink supply container. This fibrous pen construction is produced by injection molding the plastic ink supply container in a mold in which the metallic writing tube has been previously positioned whereby the writing tube is permanently attached to the plastic ink supply container. This requires complex injection molding apparatus, and also anchoring means must be provided to secure one end of the metallic writing tube in the plastic ink supply container.

In another embodiment, one end of a metallic writing tube may be secured to a plastic ink supply container by press-fitting or bonding the end of the metallic writing tube in a bore of a previously formed plastic ink supply container. However, this has the disadvantage that frequently torsion of the metallic writing tube with respect to the plastic ink supply container and leakage around the seal between the metallic writing tube and the plastic ink supply container cannot always be prevented.

Frequently, in recording instrument constructions, which include a plurality of writing tubes, it is not possible for each writing tube to extend in a straight line from the plastic ink supply container to a predetermined writing position due to the fact that several of the fibrous pens must be positioned in a relatively narrow space and the distance between writing nibs of adjacent fibrous pens must be relatively short. Thus, it is often absolutely necessary for the writing tube to have a configuration other than a straight line.

Fibrous pens have been known in the art which comprise an ink supply container and a writing tube which are made as a single unit by injection molding of plastic material. The plastic writing tube is subsequently deformed thermally to position the writing nib at a desired location. The disadvantage of this construction has been that in the course of time during use, and particularly in the presence of increased ambient temperatures, the configuration of the plastic writing tube changes due to the fact that the plastic writing tube tends to recover its initial straight configuration. Consequently, the writing nib moves from the desired or predetermined location resulting in the recording of data which is unreliable.

An object of the present invention is to provide a fibrous pen construction in which the writing tube is permanently secured to the plastic ink supply container such that the problems associated with torsion and leakage are avoided and in which the configuration of the writing tube remains fixed after deformation or bending of the writing tube to position the tip of the writing nib at a desired or predetermined location.

SUMMARY OF THE INVENTION

In accordance with the present invention the fibrous pen comprises a plastic ink supply container and a plastic outer tubular member which are formed as a single integral unit, as for example by injection molding. An inner thin-walled deformable metallic tubular member is positioned in the outer plastic tubular member to form the writing tube. The writing nib extends from a bore in the plastic ink supply container through the writing tube to a position a short distance from the free end of the writing tube. By providing the writing tube with the internal thin-walled deformable metallic tubular member, the writing tube may be bent or deformed as necessary to position the tip of the writing nib at a desired or predetermined location with the assurance that during use the writing tube will maintain its configuration and that the tip of the writing nib will remain at the desired or predetermined location.

The inner metallic tubular member may extend over the entire length of the writing tube. However, in a preferred embodiment the inner metallic tubular member is shorter than the outer plastic tubular member, one end of the inner metallic tubular member being spaced from the plastic ink supply container. The internal diameter of the bore in the plastic ink supply container and an adjacent portion of the outer plastic tubular member is smaller than the internal bore diameter of the remaining length of the outer plastic tubular member, a shoulder being provided between the smaller and larger diameter bores in the outer plastic tubular member. The shorter inner metallic tubular member may then be press-fitted into the outer plastic tubular member with one end of the inner metallic tubular member abutting the shoulder. The fibrous or lamella writing nib extends from the plastic ink supply container through the smaller diameter bore of the plastic ink supply container and a portion of the outer plastic tubular member and through the interior of the inner metallic tubular member with the tip thereof extending from the end of the writing tube.

With this improved fibrous pen construction there is substantially greater assurance that the data recorded by the recording instrument in which the fibrous pen is installed will be correct and reliable, the writing tube maintaining its configuration after being deformed primarily due to the presence of the inner thin-walled deformable metallic tubular member.

BRIEF DESCRIPTION OF THE DRAWING

Reference is made to the accompanying drawing which illustrates an embodiment of the present invention and which is a side view, partially in cross-section, of the fibrous pen of the present invention.

DETAILED DESCRIPTION OF THE INVENTION

The fibrous pen of the present invention comprises an ink container 1 and a writing tube shown generally at 7 extending downwardly therefrom. The writing tube comprises an outer tubular member 2 and an inner tubular member 3. A fibrous or lamella writing nib 4 extends from the ink container 1 through the writing tube 7 with the tip thereof extending beyond the writing tube.

The ink container 1 and outer tubular member 2 are made of a single piece of plastic material which may be formed, for example, by injection molding. The plastic material may be thermoplastic such as polyethylene or polystyrene.

The inner tubular member 3 is a thin-walled metallic tube which may consist of stainless steel or any other metallic material which is resistant to the ink. The metallic tubular member may be fitted in place by pressing the metallic tubular member into the preformed outer plastic tubular member through the open end thereof. Alternatively, the plastic ink supply container 1 and the outer plastic tubular member 2 may be injection molded while the inner metallic tubular member is positioned in the mold.

The fibrous or lamella writing nib 4 passes through the bore 5 and the interior of the inner metallic tubular member 3 with the tip of the writing nib extending beyond the end of the writing tube 7.

In the illustrated embodiment, the bore 5 extends downwardly from the plastic ink supply reservoir 1 into the outer plastic tubular member 2 a short distance below the plastic ink supply container 1. The bore of the remainder of the outer plastic tubular member 2 is larger than the first mentioned bore to accommodate the inner metallic tubular member 3. An annular shoulder 6 is provided between the smaller and larger internal diameter portions of the outer plastic tubular member 2 which serves as an abutment for one end of the metallic tubular member 3. The diameter of the bore 5 and of the interior of the inner metallic tubular member is such as to retain the writing nib 4 passing therethrough.

The writing tube 7 including the outer plastic tubular member 2 and inner metallic tubular member 3 may be deformed by providing one or more bends therein to position the pointed end of the nib 4 at a predetermined location. If necessary, heat may be applied to the outer plastic tubular member 2 during the bending operation.

The fibrous pen of the present invention which includes a one-piece plastic ink container and plastic outer tubular member with the inner deformable metallic tubular member assures that data recorded by a recording instrument will be correct and reliable. The writing tube will retain the desired configuration indefinitely due to the presence of the metallic tubular member contained within the outer plastic tubular member. At the same time, the single piece construction of the plastic ink container and plastic outer tubular member assures a torsion-resistant, leak-proof seal therebetween.

I claim:

1. A fibrous pen for recording instruments and the like and comprising:
   (a) means defining a container for an ink supply and an integral outer tubular member extending therefrom, said container and said outer tubular member comprising a single plastic piece;
   (b) an inner, deformable, metallic, thin-walled tubular member extending through at least a substantial length of said outer tubular member such that the external surface of said inner tubular member and the interior surface of said outer tubular member are coextensive, said inner and outer tubular members forming a writing tube;
   (c) a bore of predetermined diameter extending through at least the wall of said container and communicating with said outer tubular member, the internal diameter of said bore being less than the internal diameter of said outer tubular member forming an annular shoulder therebetween, one end of said inner tubular member abutting said shoulder; and
   (d) an elongated fibrous or lamella writing nib extending from said container through said bore and said inner tubular member with one end thereof projecting from the free end of said writing tube;
   (e) whereby said writing tube may be bent to and permanently maintained in any predetermined configuration to permanently locate the end of said writing nib at any selected location relative to said container.

2. A fibrous pen according to claim 1 wherein said inner metallic tubular member is press-fitted into said outer plastic tubular member.

3. A fibrous pen according to claim 1 wherein said inner metallic tubular member is fitted by injection molding in said outer plastic tubular member.

* * * * *